United States Patent [19]

Reilly

[11] 4,252,571

[45] Feb. 24, 1981

[54] BONE CHAR AND ACTIVATED CARBON MIXTURES FOR SUGAR LIQUOR PURIFICATION

[75] Inventor: Phillip B. Reilly, Pittsburgh, Pa.

[73] Assignee: Calgon Corporation, Pittsburgh, Pa.

[21] Appl. No.: 96,719

[22] Filed: Nov. 21, 1979

Related U.S. Application Data

[63] Continuation-in-part of Ser. No. 964,408, Nov. 28, 1978, abandoned.

[51] Int. Cl.$^3$ .................. C13D 3/12; B01J 20/00
[52] U.S. Cl. ........................... 127/9; 127/55; 252/437; 252/444
[58] Field of Search ............ 127/9, 55; 252/437, 252/444

[56] References Cited

U.S. PATENT DOCUMENTS

| | | | |
|---|---|---|---|
| 2,099,389 | 11/1937 | Ebert | 127/55 |
| 2,209,069 | 7/1940 | Bodenheim | 127/55 |
| 2,372,996 | 4/1945 | Wickenden | 127/55 |
| 2,557,948 | 6/1951 | Deitz | 127/55 X |
| 2,677,667 | 5/1954 | Howarth | 127/55 X |
| 2,831,818 | 4/1958 | Barrett | 252/444 X |
| 2,851,428 | 9/1958 | Wayne | |
| 3,021,287 | 2/1962 | Barrett | 252/444 X |
| 3,194,683 | 7/1965 | Grosvenor | 127/55 X |

OTHER PUBLICATIONS

Sugar Industry Abstracts, vol. 14, Abstract 516, 1952.
Sakharaya Promyshlennost, v. 36, (II), D. T. Shbets, Granulated Charcoals for the Sugar–Refining Industry, (1962).
John W. Hassler, Purification with Activated Carbon, Chem. Pub. Co., 1974, pp. 88–89.

*Primary Examiner*—Sidney Marantz
*Attorney, Agent, or Firm*—Mario A. Monaco; Martin L. Katz; Edmunde D. Riedl

[57] ABSTRACT

An admixture of granular activated carbon (GAC) and bone char (BC) can be effectively employed to decolorize and to deash white cane sugar liquors. Use of this admixture in place of bone char exclusively results in significantly improved decolorization. The GAC/BC admixture can be effectively reactivated at a temperature within the limit of 900° F. to 1200° F.

9 Claims, No Drawings

BONE CHAR AND ACTIVATED CARBON MIXTURES FOR SUGAR LIQUOR PURIFICATION

This application is a continuation-in-part of U.S. Patent Application Ser. No. 964,408, filed Nov. 28, 1978, abandoned.

DISCLOSURE OF THE INVENTION

This invention relates to admixtures of granular activated carbon and bone char which may be utilized for decolorizing and deashing cane sugar liquors. More particularly, this invention pertains to a new adsorption media and an improved process for decolorizing cane sugar liquors and a new process for thermally regenerating the spent admixture.

The process of refining cane sugar may be subdivided into the following unit operations and unit processes. From a storage facility within a sugar refinery, raw cane sugar is transformed in bulk quantities to a raw sugar bin. The first step in refining is "affination" wherein the raw sugar crystals are treated with a heavy syrup in order to remove the film of adhering molasses. The resulting syrup is removed by a centrifuge and the sugar crystals are sprayed with water. The washed crystals are dumped into a "melter" wherein they are dissolved in about half their weight of hot water and/or sweet water. The second stage is "defecation" wherein the raw liquor is prepared for filtration and clarification by removing solid impurities. During this operation, a flocculent precipitate is formed on addition of lime and either carbon dioxide or phosphoric acid. This precipitate entangles the suspended and/or colloidal matter and thereby allows removal of this matter from the process by filtration. The resulting effluent, which is now free of insoluble materials, is then passed through an adsorbent media which removes significant amounts of dissolved impurities (i.e., color bodies and ash constituents). Traditionally, the adsorbent media utilized for this application has been bone char. Bone char was employed extensively in past times because it was the first material available in bulk quantities as are required for this application, because of well-established process concepts deeply implanted within existing refinery operations and because bone char provided purification (i.e., decolorization and deashing) required to yield a clarified liquor from which may be crystallized a final product of acceptable quality.

Many present day refineries still employ the classic process of simultaneously decolorizing and deashing cane liquor by passing the liquor through bone char. The bone char is regenerated by washing the media sufficiently well with water followed by heating at temperatures of 900° F. to 1200° F. in a controlled atmosphere to maintain its carbon content.

The color removal capacity of bone char is generally the limiting factor determining its service life. If service life could be extended, there would be realized a great saving in labor and other processing costs.

Heretofore, bone char and activated carbon were not directly combined as such for use in a single bed. It was generally believed that conditions necessary for the regeneration of bone char were insufficient to regenerate the activated carbon and that conditions that were sufficient to regenerate the activated carbon would destroy the bone char. Thus, it was not thought that a spent admixture of bone char and activated carbon could be regenerated concomitantly as a composite without first separating them into their component parts. Additionally, there was concern about the handling of the admixture in the equipment presently used in bone char refineries.

While others have attempted to combine a so-called bone char skeleton with activated carbon, spent activated carbon was separated from bone char in the admixture prior to reactivation. In U.S. Pat. No. 2,209,069, a charred form of a spent bone char was combined with powdered activated carbon and after exhaustion, the activated carbon was separated by a hydraulic mechanism from the bone char.

In this invention, granular activated carbon and bone char are combined to provide a decolorizing and a deashing medium for processing of white cane sugar liquors and other feed liquors for yellow sugar production. This admixture does not require separation during the regeneration cycle. Such a process modification provides several benefits to the refinery whereby significant savings in the operating costs could be realized. These benfits include (a) significant reduction in the amounts of process water required and sweet water produced; (b) increase in the melt capacity of a refinery where decolorization is a bottleneck; (c) reduced energy consumption associated with the reduction in regeneration requirements of the mixture because of extended service life and, also, hot process water requirements; (d) reduced labor costs; (e) better overall process control; and (f) improved quality of sweet water produced.

Through this invention, the deashing capacity of the admixture and its decolorizing capacity can be balanced so that both parameters become more or less simultaneously exhausted. To this end, a plausible substitute for conventional bone char in the usual refinery bed is an admixture of bone char and granular activated carbon in which greater than 10 percent by weight of activated carbon is employed, but the mixture may be comprised of activated carbon composition from 10 percent to 50 percent by weight. The most preferred compositions include from 10 percent to 30 percent by weight activated carbon. The remainder of the composition consists essentially of bone char, but there can be included, if desired, from 3 percent to 8 percent by weight based on the weight of activated carbon of a pH control agent such as magnesium oxide, so-called dead burned magnesite which may inhibit undesired pH shifts in the sugar syrup and consequent inversion (hydrolysis) of the sugar content on processing of the syrup. While this agent or other suitable material can be randomly added to the composition of this invention, it is highly preferred that the agent is an impregnant of the activated carbon.

This admixture can be used in place of the bone char in any of the char cisterns presently employed to contain the adsorption media such as, but without limitation, fluidized and other expanded beds, and the admixture can be suitably handled in the equipment presently used for bone char, thereby eliminating or minimizing the need for new capital investment. Furthermore, the mixture can be prewetted by standard methods used for bone char in the refineries whereby the amount of sweet water produced will be very similar to the amounts presently produced in bone char operations.

While the balancing of the deashing and decolorizing capacity of bone char is not a newly discovered goal, the discovery of accomplishing it by adding granular activated carbon is unique since until now, it was not appreciated that the two could be regenerated as a composite without first separating the admixture and regenerating each component individually at its optimum conditions. We have found that the mixture of granular activated carbon and bone char may be regenerated and used through a minimum of five cycles without any appreciable loss of capacity.

In the process of regeneration, the existing equipment, such as Herreshoff kilns and retort-type kilns, already installed for regenerating bone char may be employed. In regeneration, the spent bed is washed to remove sugar liquors and to regenerate deashing capacity. The spent bed is then unloaded from an adsorber vessel and the excess wash water drained off from the adsorption media. The damp admixture is then placed in the regeneration kiln. The temperature may be raised to an operating value within the limits of 900° F. and 1200° F.

The regeneration of the mixture should be performed in a gas atmosphere containing controlled levels of oxygen usually between 0.5 to 2 percent. The controlled atmosphere can be maintained by replacing the oxygen normally found in air with combustion gas and/or steam. While the wet or damp admixture is being heated in the furnace, an auxiliary source of steam into the regeneration zone may be added.

The regeneration conditions are such that at least 90 percent of the original decolorization capacity of the mixture is restored upon regeneration. Usually, a period of up to four hours is sufficient in a multiple hearth furnace operating at temperatures in the range of 900° F. to 1200° F. However, at lower temperatures, a longer time period, up to nine hours, might be required.

The following experimental results illustrate the utility and performance of the admixture of this invention.

Two parallel one-inch diameter and 20.4 feet bed depth column studies with bone char and bone char/virgin granular activated carbon mixture were conducted. The effluent sugar solution from the columns was analyzed for color by utilizing spectrophotometry for absorbance at 420, 560 and 720 nm, pH, brix and conductometric ash. These tests were conducted by following accepted analytical techniques in the sugar industry. In cycle 1, service bone char and virgin granular activated carbon were used for the mixture. At 20.4 feet bed depth, bone char and granular activated carbon mixtures outperformed the bone char system for color removal at all times. Up to approximately 20 percent color breakthrough level, the bone char/granular activated carbon mixture generated an effluent color quality equivalent to that obtained by bone char alone over a service time of approximately two (2) times that afforded by bone char. For ash removal (measured conductometrically), bone char columns outperformed bone char/granular activated carbon mixtures above 40 percent ash removal. The calcium levels, in particular, of the effluent sugar solution at 20.4 feet bed depth were also measured. Even at 140 hours of column run, bone char columns were removing only 7 percent more calcium in comparison with bone char/granular activated carbon columns.

The spent bone char and bone char/granular activated carbon mixtures were sweetened off following standard procedures used in sugar refineries and were subsequently regenerated using typical bone char regeneration conditions at 1000° F. (additional details are described later in the text). The column studies were repeated using regenerated bone char and bone char/granular activated carbon mixtures. In these studies, no make-up bone char or bone char/granular activated carbon mixtures were used. As a result of handling and regeneration losses, the total bed depth decreased from 20.4 feet in the first cycle to 19.4 feet in the second cycle for both the bone char and bone char/granular activated carbon systems. Even with this reduced bed depth, the bone char/granular activated carbon admixture provided an effluent color quality equivalent to that obtained by bone char alone over a service time of approximately 1.9 times that afforded by bone char. These results showed that the spent mixture could be regenerated to recover at least 95 percent of the original decolorization capacity.

The aforementioned results clearly showed that for sugar decolorization, bone char/granular activated carbon mixture performed significantly better than bone char alone. Although bone char columns were better for ash removal than the mixture, the calcium removal was only slightly better.

The laboratory regeneration of the admixture of this invention is preferably accomplished in accordance with the following procedure.

The spent bone char/granular activated carbon mixture was sweetened off with water following standard industrial procedure. The admixture is then dried in air at room temperature overnight. The admixture was regenerated in a furnace which simulates a Herreshoff furnace. The furnace was maintained at 1000° F. As the admixture is introduced into the furnace, the temperature drops from 1000° F. to 600° F. The time for bringing the furnace back to the preferred temperature of 1000° F. was approximately 20 minutes. The mixture was regenerated at 1000° F. for 25 minutes. During the entire process, a controlled oxygen atmosphere was maintained. A 3 liters/minute gas (0.5 percent $O_2$ in $N_2$) flow rate was used. After regeneration, the admixture was removed from the furnace and placed in a closed container to minimize exposure to air. After cooling to room temperature, the material is stored for reuse in the process of this invention.

The granular activated carbon, like the bone char employed in this invention, is suitable 8×50 mesh and preferably an 8×35 mesh. By that term, it is meant that from 0 percent to 5 percent by weight of the granular material is retained by the larger U.S. Standard Sieve, and from 0 percent to 5 percent by weight is passed by the smaller sieve of the range.

Generally, any granular size is satisfactory, as long as it is not so small as to become suspended in the filtrate and carried from the bed, nor so large as to seriously limit the surface area exposed. Those skilled in the art have been using granular bone char routinely for sugar liquor filtration and, generally, the granular activated carbon should have an equivalent size range to that of the bone char employed therewith.

The preferred activated carbon is one impregnated with magnesium oxide and available under the trademark, CANE-CAL ®.

What is claimed is:

1. In a system of decolorizing and deashing cane sugar liquor wherein the cane sugar liquor is passed through a carbon-containing filter to remove ash and color, the improvement consisting of providing a bed comprising an admixture of from about 10 percent to 50 percent by weight granular activated carbon and from about 50 percent to 90 percent by weight granular bone char.

2. A system according to claim 1 wherein the bed contains from about 10 percent to about 30 percent by weight granular activated carbon.

3. A system according to claim 1 wherein the granular size of the bone char and activated carbon is from 8×50 mesh.

4. In a process for deashing and decolorizing cane sugar liquor wherein the liquor is passed through a carbon-containing material for decolorizing and deashing, the improvement consisting of passing the sugar liquor through a bed comprising an admixture of from about 10 percent to 50 percent by weight granular activated carbon and from about 50 to 90 percent by weight of granular bone char.

5. A system according to claim 4 wherein the bed contains from about 10 percent to about 30 percent by weight granular activated carbon.

6. A process according to claim 4 wherein the granular size of the bone char and activated carbon is at least 8×50 mesh.

7. An admixture of bone char and activated carbon for removal of color bodies and ash from cane sugar liquor comprising from 10 percent to 50 percent by weight of a granular activated carbon and from 50 percent to 90 percent by weight of a granular bone char.

8. A system according to claim 7 wherein the bed contains from about 10 percent to about 30 percent by weight granular activated carbon.

9. An admixture according to claim 7 where the granular bone char and activated carbon is about 8×50 mesh.

* * * * *